United States Patent
Kameyama et al.

(10) Patent No.: US 10,538,723 B2
(45) Date of Patent: Jan. 21, 2020

(54) MAINTENANCE LIQUID FOR ACTIVE ENERGY RAY-CURABLE INKJET INK

(71) Applicants: TOYO INK SC HOLDINGS CO., LTD., Chuo-ku (JP); TOYO INK CO., LTD., Chuo-ku (JP)

(72) Inventors: Yuji Kameyama, Tokyo (JP); Yohei Konda, Tokyo (JP); Kazuhiro Jonai, Tokyo (JP)

(73) Assignees: TOYO INK SC HOLDINGS CO., LTD, Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 14/784,380

(22) PCT Filed: Apr. 16, 2014

(86) PCT No.: PCT/JP2014/060832
§ 371 (c)(1),
(2) Date: Oct. 14, 2015

(87) PCT Pub. No.: WO2014/171488
PCT Pub. Date: Oct. 23, 2014

(65) Prior Publication Data
US 2016/0032226 A1    Feb. 4, 2016

(30) Foreign Application Priority Data
Apr. 17, 2013   (JP) .................... 2013-086797

(51) Int. Cl.
| C11D 7/50 | (2006.01) |
| B41J 2/165 | (2006.01) |
| C11D 3/37 | (2006.01) |
| C09D 11/36 | (2014.01) |
| C09D 11/101 | (2014.01) |
| C09D 11/322 | (2014.01) |

(52) U.S. Cl.
CPC ......... *C11D 7/5022* (2013.01); *B41J 2/16552* (2013.01); *C09D 11/101* (2013.01); *C09D 11/322* (2013.01); *C09D 11/36* (2013.01); *C11D 3/373* (2013.01); *C11D 3/3765* (2013.01); *C11D 7/5004* (2013.01)

(58) Field of Classification Search
CPC .......................... C11D 7/5022; B41J 2/16552
See application file for complete search history.

(56) References Cited

U.S. PATENT DOCUMENTS

| 8,851,624 B2 * | 10/2014 | Kodama | B82Y 10/00 |
| | | | 134/22.1 |
| 9,156,266 B2 * | 10/2015 | Ichihara | B41J 2/16508 |
| 2007/0225185 A1 * | 9/2007 | Kasai | B41J 2/16552 |
| | | | 510/170 |
| 2010/0126529 A1 * | 5/2010 | Seki | B41J 2/16552 |
| | | | 134/22.1 |
| 2011/0074866 A1 * | 3/2011 | Imamura | C09D 11/322 |
| | | | 347/21 |
| 2012/0004385 A1 * | 1/2012 | Kodama | B82Y 10/00 |
| | | | 526/320 |
| 2012/0033011 A1 * | 2/2012 | Ohya | B41M 5/0023 |
| | | | 347/20 |
| 2012/0189822 A1 * | 7/2012 | Ito | C09D 11/101 |
| | | | 428/195.1 |
| 2013/0094079 A1 * | 4/2013 | Fujishiro | G02B 3/0031 |
| | | | 359/463 |
| 2013/0222468 A1 * | 8/2013 | Oyanagi | B41J 11/002 |
| | | | 347/28 |
| 2014/0292924 A1 * | 10/2014 | Ichihara | B41J 2/16508 |
| | | | 347/37 |
| 2016/0032226 A1 * | 2/2016 | Kameyama | C11D 3/373 |
| | | | 510/170 |

FOREIGN PATENT DOCUMENTS

| CN | 101004560 A | 7/2007 |
| EP | 1 837 182 A1 | 9/2007 |
| JP | 6 8437 | 2/1994 |
| JP | 2007 253401 | 10/2007 |
| JP | 2007 254550 | 10/2007 |
| JP | 2007253401 A | * 10/2007 |
| JP | 2007254550 A | * 10/2007 |
| JP | 2009-179681 A | 8/2009 |
| JP | 2010-137458 A | 6/2010 |
| JP | 2010 222525 | 10/2010 |
| JP | 2010222525 A | * 10/2010 |
| JP | 2011 126147 | 6/2011 |
| JP | 2012 31389 | 2/2012 |
| JP | 5027444 | 9/2012 |
| JP | 2013-6294 A | 1/2013 |

OTHER PUBLICATIONS

JP2007253401 A, A Machine Translation.*
JP 2010222525 A, A Machine Translation.*
English Translation. JP-2007 254550-A. Kasai, Kiyosuke (Year: 2007).*

(Continued)

*Primary Examiner* — Mark Eashoo
*Assistant Examiner* — M. Reza Asdjodi
(74) *Attorney, Agent, or Firm* — Sughrue Mion, PLLC

(57) ABSTRACT

Provided is a non-aqueous maintenance liquid for an active energy ray-curable inkjet ink which can be used as a cleaning liquid for removing the inkjet ink and as a preserving liquid to fill the head when the printer is not in operation. The non-aqueous maintenance liquid for an active energy ray-curable inkjet ink of the present invention comprises a main liquid component, a pigment dispersant resin, and a surface control agent, wherein the main liquid component is an organic solvent and/or an active energy ray-curable compound, and the amount of the surface control agent is 0.01 to 10% by weight in 100% by weight of the maintenance liquid.

17 Claims, No Drawings

(56) References Cited

OTHER PUBLICATIONS

Combined Chinese Office Action and Search Report dated May 5, 2016 in Patent Application No. 201480021379.2 (with English language translation).
English translation of International Preliminary Report on Patentability and Written Opinion dated Oct. 29,2015 in PCT/JP2014/060832.
Extended European Search Report dated Mar. 8, 2016 in Patent Application 14784882.4.
International Search Report dated Jul. 8, 2014 in PCT/JP14/060832 Filed Apr. 16, 2014.
Office Action issued in corresponding European Application No. 14784882.4 dated Dec. 14, 2018.
Communication dated May 14, 2019, from the European Patent Office in counterpart European Application No. 14784882.4.
Communication dated Sep. 6, 2019, from the European Patent Office in counterpart European Application No. 14784882.4.

\* cited by examiner

MAINTENANCE LIQUID FOR ACTIVE ENERGY RAY-CURABLE INKJET INK

TECHNICAL FIELD

The present invention relates to a maintenance liquid to be used with an ink used in active energy ray-curable inkjet printing. This maintenance liquid may be used as a cleaning liquid for removing the inkjet ink, and also as a preserving liquid to fill the head when the printer machine is not in operation. Accordingly, the present invention relates to a maintenance liquid having excellent cleaning and preserving abilities.

BACKGROUND ART

The inkjet printing method records images or characters by sticking fine droplets of ink compositions onto the substrates to be printed, and is characterized by the fact that it does not use a plate in the printing process. Another well-known printing method not using a plate is the electrophotographic printing method, but the inkjet printing method is considered superior in such aspects as device cost, running cost and printing speed, and the demand for inkjet printing is further expanding as there is increased demand for on-demand printing.

Concurrently with the improvement of the performance of the inkjet heads in the recent years, a focus is being placed on how to deal with small-lot printing in the existing printing market. In the printing market, productivity is important, and the single-pass mode characterized by its high printing speed is mostly used. A wide variety of printing substrates exist in the printing market, such as paper-based substrates and film-based substrates, and the inks may show different levels of adhesion depending on the substrates. In order to deal with high printing speed and multi-substrate printing, active energy ray-curable inks having fast cure speed and excellent versatility with respect to substrate adhesion are most suitable.

In the single-pass mode, missing dots (also called missed nozzles) caused by clogging of the nozzle etc. would conspicuously affect the image quality, and therefore the inks are required to have good jettability. Therefore, it is desirable that a cleaning liquid have not only excellent cleaning ability but also ability to suppress pigment aggregation which may occur upon the ink cleaning and cause jetting failure (i.e. ability to stabilize dispersion of the pigments), as well as preserving capability, e.g. ability to preserve water repellency of the nozzle plate.

However, the currently existing cleaning and preserving liquids (hereinafter also referred to as maintenance liquids), when removing the ink, would dilute the ink concentration to disturb the dispersion of the pigments, which likely leads to the clogging of the nozzle because of the aggregated pigments and to the eventual occurrence of jetting failure. Especially, when the ink is cleaned off and then the head is filled with a maintenance liquid to ship the printer, the ink will be kept in a dilute condition for an extended period of time, and the risk of clogging the nozzle will increase significantly. Moreover, the pigment surface following the disturbance of the dispersion is in a state of very high surface free energy, which causes the pigment to adhere not only to the printer and the ink passages within the head, but also strongly to the nozzle plate surface, causing deterioration of the water-repellency of the nozzle plate.

Thus, in developing a maintenance liquid for active energy ray-curable inkjet inks, it is important to impart good cleaning ability and preserving ability to the liquid.

Previously considered cleaning liquids include those of Patent Documents 1 and 2, which use a surface control agent to achieve an excellent cleaning ability and jettability, but these liquids are not designed for preserving ability, and therefore do not support long-term storage where the ink is left in a dilute condition. Moreover, these liquids are cleaning liquids for aqueous inks and are not suited for use with active energy ray-curable inks. On the other hand, the cleaning liquid for active energy ray-curable inks according to Patent Document 3 comprises a dispersant resin to achieve cleaning ability as well as dispersion stability of the pigments included in the ink. However, the pigment dispersant resins used with the active energy ray-curable inks are of high adsorbability, which is unlike the electric repulsion-based dispersion used for example in aqueous settings. Therefore, if there are excess dispersant resins in the maintenance liquid that do not adsorb to the pigments, the dispersant resins would adsorb to the nozzle plate surface, impairing the water repellency and substantially reducing the jetting stability.

As outlined above, cleaning liquids for removing active energy ray-curable inkjet inks and preserving liquids having such qualities as excellent cleaning ability and preserving ability have not been available in the current state of art.

PRIOR ART DOCUMENTS

Patent Documents

Patent Document 1: JP 2011-126147 A
Patent Document 2: JP 5027444 B
Patent Document 3: JP 2007-254550 A

SUMMARY OF INVENTION

The present invention provides a maintenance liquid having excellent cleaning ability and preserving ability, which is a cleaning liquid for removing the inks used in active energy ray-curable inkjet printing and also a preserving liquid to fill the head when the machine is not in operation.

The present inventors discovered that the above-mentioned problems can be solved by using cleaning liquids for removing active energy ray-curable inkjet inks and preserving liquids, said liquids at least comprising one or more main liquid components, one or more pigment dispersant resins, and one or more surface control agents, to complete the present invention.

Thus, the present invention relates to the following aspects (1) to (9).

(1) A non-aqueous maintenance liquid for an active energy ray-curable inkjet ink, the liquid comprising a main liquid component, a pigment dispersant resin, and a surface control agent,
wherein the main liquid component is an organic solvent and/or an active energy ray-curable compound.

(2) The maintenance liquid of the foregoing item, wherein the amount of the surface control agent is 0.01 to 10% by weight in 100% by weight of the maintenance liquid.

(3) The maintenance liquid of the foregoing items, wherein the amount of the pigment dispersant resin is 0.02 to 5% by weight in 100% by weight of the maintenance liquid.

(4) The maintenance liquid of the foregoing items, wherein the surface control agent comprises an acrylic, silicone-based, or fluorinated surface control agent.

(5) The maintenance liquid of the foregoing items, wherein the surface control agent comprises a polyether modified dimethylsiloxane silicone-based surface control agent.

(6) The maintenance liquid of the foregoing items, wherein the active energy ray-curable compound comprises one or more compounds selected from the group consisting of dipropylene glycol diacrylate, 2-(2-vinyloxyethoxy)ethyl acrylate, and phenoxyethyl acrylate.

(7) The maintenance liquid of the foregoing items, wherein the active energy ray-curable compound comprises at least one polymerizable monomer used in the ink.

(8) The maintenance liquid of the foregoing items, further comprising 0.05 to 5% by weight of a polymerization inhibitor in 100% by weight of the maintenance liquid.

(9) The maintenance liquid of the foregoing items, wherein the organic solvent comprises one or more solvents selected from diethylene glycol monobutyl ether acetate and diethylene glycol diethyl ether.

The maintenance liquid of the present invention can achieve excellent cleaning ability and preserving ability by comprising, at least, one or more main liquid components, one or more pigment dispersant resins, and one or more surface control agents.

DESCRIPTION OF EMBODIMENTS

The maintenance liquid of the present invention is a maintenance liquid for an active energy ray-curable inkjet ink, comprising, at least, one or more main liquid components, one or more pigment dispersant resins, and one or more surface control agents. The maintenance liquid in the present invention can be used as a cleaning liquid and as a preserving liquid. Thus, in the present invention, a maintenance liquid means either a cleaning liquid, or a preserving liquid, or both. Also, in the present specification, a maintenance liquid may be simply referred to as a cleaning liquid.

The cleaning liquid in the present invention may be suitably used for cleaning ink passages inside a printer which jets an energy ray-curable inkjet ink from a head and for cleaning the head. The preserving liquid is a liquid to replace the ink within the printer during shipment or when printing is not performed for an extended period of time, and may be used to prevent the jetting failure caused by clogging of the nozzle due to cured ink, aggregated pigments, or the like.

As the main liquid component in the present invention, a common organic solvent or active energy ray-curable compound may be used. Moreover, an organic solvent and an active energy ray-curable compound may be used in combination as needed.

The main liquid component is comprised preferably at 85% by weight or more, and more preferably 90% by weight or more, in 100% by weight of the maintenance liquid.

Specific examples of the organic solvents include, but are not particularly limited to: glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate; glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, diethylene glycol acetate propionate, diethylene glycol acetate butyrate, diethylene glycol propionate butyrate, diethylene glycol dipropionate, propylene glycol acetate propionate, propylene glycol acetate butyrate, propylene glycol propionate butyrate, propylene glycol dipropionate, dipropylene glycol acetate propionate, dipropylene glycol acetate butyrate, dipropylene glycol propionate butyrate, and dipropylene glycol dipropionate; glycols such as ethylene glycol, diethylene glycol, triethylene glycol, propylene glycol, and dipropylene glycol; glycol ethers such as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; glycol diethers such as diethylene glycol dimethyl ether, diethylene glycol diethyl ether, diethylene glycol di-n-propyl ether, diethylene glycol di-isopropyl ether, diethylene glycol dibutyl ether, diethylene glycol methyl ethyl ether, triethylene glycol dimethyl ether, triethylene glycol diethyl ether, triethylene glycol ethyl methyl ether, tetraethylene glycol dimethyl ether, tetraethylene glycol diethyl ether, and tetraethylene glycol ethyl methyl ether; and lactates such as methyl lactate, ethyl lactate, propyl lactate, and butyl lactate. Among these, ethylene glycol monobutyl ether acetate, diethylene glycol monoethyl ether acetate, diethylene glycol monobutyl ether acetate, diethylene glycol diethyl ether, and tetraethylene glycol dimethyl ether are preferable, and in view of the compatibility with the head and printer materials and the cleaning ability, diethylene glycol monobutyl ether acetate and diethylene glycol diethyl ether are more preferable. One type of organic solvent, or two or more types of organic solvents as needed, may be used.

If an active energy ray-curable compound is used, a monofunctional or bifunctional active energy ray-curable compound is suited for imparting to the maintenance liquid a viscosity suitable for cleaning. Specific examples include, but are not limited to, isobornyl acrylate, lauryl acrylate, cyclohexyl acrylate, tetrahydrofurfuryl acrylate, 4-t-butyl cyclohexyl acrylate, caprolactone modified tetrahydrofurfuryl acrylate, t-butyl acrylate, isobutyl acrylate, iso-octyl acrylate, iso-stearyl acrylate, stearyl acrylate, isoamyl acrylate, trimethylolpropane formal monoacrylate, trifluoroethyl acrylate, acryloylmorpholine, N-vinylpyrrolidone, N-vinylcaprolactam, hydroxyphenoxyethyl acrylate, 2-hydroxy-3-phenoxypropyl acrylate, 2-hydroxyethyl acrylate, 2-hydroxypropyl acrylate, 4-hydroxybutyl acrylate, 2-acryloyloxypropyl phthalate, β-carboxyethyl acrylate, benzyl acrylate, methylphenoxyethyl acrylate, 2-phenoxyethyl acrylate (or ethylene oxide and/or propylene oxide adduct monomer thereof), phenoxy diethylene glycol acrylate, 1,4-cyclohexanedimethanol monoacrylate, N-acryloyloxyethyl hexahydrophthalimide 2-methoxyethyl acrylate, methoxy triethylene glycol acrylate, 2-ethoxyethyl acrylate, 3-methoxybutyl acrylate, ethoxyethoxyethyl acrylate, butoxyethyl acrylate, methoxy dipropylene glycol acrylate, dipropylene glycol acrylate, ethoxylated succinate acrylate, ω-carboxy polycaprolactone monoacrylate, ethylene glycol diacrylate, diethylene glycol diacrylate, polyethylene glycol diacrylate, dipropylene glycol diacrylate, 1,6-hexanediol diacrylate, 1,9-nonanediol diacrylate, 1,10-decanediol diacrylate, ethoxylated 1,6-hexanediol diacrylate, neopentyl glycol diacrylate, polypropylene glycol diacrylate, 1,4-butanediol diacrylate, tetraethylene glycol diacrylate, 2-n-butyl-2-ethyl-1,3-propanediol diacrylate, hydroxypivalate neopentyl glycol diacrylate, 1,3-butylene glycol diacrylate, tripropylene glycol diacrylate, ethoxylated tripropylene glycol diacrylate, neopentyl glycol modified trimethylolpropane diacrylate, stearate modified pentaerythritol diacrylate, neopentyl glycol oligoacrylate, 1,4-butanediol oligoacrylate, 1,6-hexanediol oligoacrylate, ethoxylated neopentyl glycol diacrylate, propoxylated neopentyl glycol diacrylate, tripropylene glycol diacrylate, bisphenol A diacrylate, dimethylol tricyclodecane diacrylate, propoxylated bisphenol A diacrylate, ethoxylated bisphenol A diacrylate, bisphenol F diacrylate, ethoxylated bisphenol F diacrylate, propoxylated bisphenol F diacrylate, cyclohexane dimethanol diacrylate, dimethylol dicyclopentane diacrylate, isocyanurate diacrylate, propoxylated isocyanurate diacrylate, and 2-(2-vinyloxyethoxy)ethyl acrylate. One type of active energy ray-curable compound, or two or more types of active energy ray-curable compounds as needed, may be used.

Among these, it is preferable to use any of 2-phenoxyethyl acrylate, dipropylene glycol diacrylate, and 2-(2-vinyloxyethoxy)ethyl acrylate in view of the viscosity, stability, and compatibility with the inkjet head materials.

The maintenance liquid preferably comprise 30% by weight or more of an active energy ray-curable compound, more preferably 50% by weight or more and even more preferably 70% by weight or more.

The viscosity of the cleaning liquid is desirably 50 mPa·s or lower at 25° C. in order to provide good cleaning ability. The viscosity of the cleaning liquid is preferably 5 to 30 mPa·s, more preferably 10 to 20 mPa·s. If the maintenance liquid is used as a preserving liquid, it is desirable that the maintenance liquid comprise, as the active energy ray-curable compound, 30% by weight or more of at least one monomer used in the ink. The amount of this at least one monomer as the active energy ray-curable compound is preferably 50% by weight or more, and more preferably 70% by weight or more. The inclusion of the monomer used in the ink as the active energy ray-curable compound in the maintenance liquid further improves stability of the pigment dispersion, and moreover, enables maintenance of a compatibility balance in which the surface control agent comprised in the maintenance liquid can readily exert its effect as well as maintenance of good printability free of missed nozzles.

In the present invention, a pigment dispersant resin is included to improve the dispersibility of the pigment upon ink cleaning and to improve the preserving ability of the preserving liquid. The pigment dispersant resin in the present invention refers to a resin that can disperse the pigment used in the active energy ray-curable inkjet ink, and is not particularly limited as long as it has the dispersing ability, although it is preferably the same pigment dispersant resin included in the ink to be cleaned off.

As the pigment dispersant resin, a carboxylic acid ester containing a hydroxyl group, a salt of a long chain polyamino amide and a high molecular weight acid ester, a salt of a high molecular weight polycarboxylic acid, a salt of a long chain polyamino amide and a polar acidic ester, a high molecular weight unsaturated acid ester, a high molecular weight copolymer, a modified polyurethane, a modified polyacrylate, a polyether ester type anionic active agent, a salt of naphthalenesulfonic acid formalin condensate, a salt of aromatic sulfonic acid formalin condensate, a polyoxyethylene alkyl phosphoric acid ester, a polyoxyethylene nonylphenyl ether, a stearylamine acetate or the like may be used.

Specific examples of the pigment dispersant resin include "Anti-Terra-U (phosphoric acid salt of polyamino amides)", "Anti-Terra-203/204 (high molecular weight polycarboxylic acid salt)", "Disperbyk-101 (phosphoric acid salt of polyamino amides and an acid ester), 107 (hydroxyfunctional carboxylic acid ester), 110, 111 (copolymer containing acidic groups), 130 (polyamide), 161, 162, 163, 164, 165, 166, 168, 170, and LPN22252 (block copolymer with affinity for pigments)", "400", "Bykumen" (high molecular weight unsaturated acid ester), "BYK-P104, and P105 (high molecular weight unsaturated acid polycarboxylic acid)", "P104S, and 240S (high molecular weight unsaturated acid polycarboxylic acid and silicone)", and "Lactimon (long chain amine and unsaturated acid polycarboxylic acid and silicone)" manufactured by BYK Chemie.

Other examples include "Efka 44, 46, 47, 48, 49, 54, 63, 64, 65, 66, 71, 701, 764, 766, and 7701", "Efka Polymer 100 (modified polyacrylate), 150 (aliphatic modified polymer), 400, 401, 402, 403, 450, 451, 452, 453 (modified polyacrylate), and 745 (copper phthalocyanine-based)" manufactured by Efka CHEMICALS; "FLOWLEN TG-710 (urethane oligomer)", "FLOWNON SH-290, and SP-1000", and "POLYFLOW No. 50E and No. 300 (acrylic copolymer)" manufactured by Kyoeisha Chemical; DISPARLON KS-860, 873SN, 874 (polymeric pigment dispersant resin), #2150 (aliphatic polyvalent carboxylic acid), and #7004 (polyether ester type)" manufactured by Kusumoto Chemicals.

Still other examples include "DEMOL RN, N (naphthalene sulfonic acid formalin condensate sodium salts), MS, C, SN—B (aromatic sulfonic acid formalin condensate sodium salts), and EP", "HOMOGENOL L-18 (polycarboxylic acid type polymer)", "EMULGEN 920, 930, 931, 935, 950, 985 (polyoxyethylene nonyl phenyl ether)", and "ACETAMIN 24 (coconut amine acetate), and 86 (stearylamine acetate)" manufactured by Kao; "Solsperse 5000 (phthalocyanine ammonium salt-based), 13940 (polyester amine-based), 17000 (fatty acid amine-based), 24000GR, 32000, 33000, 35000, 39000, 41000, 53000, J-100, and J-180 (polyalkyleneimine-based)" manufactured by Lubrizol; "Nikkol T106 (polyoxyethylene sorbitan monooleate), MYS-IEX (polyoxyethylene monostearate), and Hexagline 4-0 (hexaglyceryl tetraoleate)" manufactured by Nikko Chemicals; "AJISPER-PB821, 822, 824, 827 and 711 (copolymers containing basic functional groups)" manufactured by Ajinomoto Fine-Techno; "TEGO Disper 685 (modified polyester)" manufactured by Tego Chemie Services; and the likes.

Among the above-mentioned pigment dispersant resins, basic dispersant resins having basic functional groups with affinity for the pigments, basic dispersant resins having urethane skeletons, and polyalkyleneimine-based pigment dispersant resins are preferably used.

For example, "BYK-LPN22252" manufactured by BYK Chemie, and "Solsperse 32000, J-100, and J-180" manufactured by Lubrizol are preferable. These resins adsorb well to the pigments and show particularly good dispersion stability, and therefore provide good cleaning and preserving abilities even if they are different pigment resins from those included in the ink to be cleaned off.

The pigment dispersant resin is comprised in the cleaning liquid preferably at 0.01 to 10% by weight, more preferably at 0.02 to 5% by weight, and even more preferably at 0.05 to 3% by weight.

The pigment dispersant resin, even if only a small amount of it (such as 0.01% by weight or so) is present in the cleaning liquid, may exert the effect of stabilizing the pigment dispersion when the ink is diluted, to improve the cleaning and preserving abilities. With 0.02% by weight or more of the pigment dispersant resin, the pigment dispersion may be even further stabilized, continuous jettability may be improved, and good printability free of missed nozzles can be sustained. If the amount of the pigment dispersant resin exceeds 5% by weight, the excess pigment dispersant resin that did not adsorb to the pigment would adhere to the nozzle plate surface of the head, causing deterioration of the water-repellency.

In the present invention, a surface control agent is used to maintain good water repellency on the nozzle plate and to sustain printability. A surface control agent is a type of agents called surfactants, having a hydrophobic group and a hydrophilic group within the molecule. It shows low solubility in water despite having the hydrophilic group, and when added to an ink composition, it serves to reduce the surface tension of the composition. A surface control agent in the present invention refers to resins and compounds which can reduce the surface tension of the maintenance liquid by 0.5 mN/m or more when added to the cleaning liquid at 1.1; by weight.

The surface control agents used in the present invention are those suitable for non-aqueous maintenance liquids, and include those containing, as a main component, an acrylic surface control agent such as acrylic copolymer, polyether modified polydimethylsiloxane, a mixture of polyether modified polydimethylsiloxane and polyether, polyester modified polydimethylsiloxane, polyester modified methyl-alkylsiloxane, polyether modified polymethylalkylsiloxane, aralkyl modified polymethylalkylsiloxane, polyester modified polydimethylsiloxane containing a hydroxyl group, polyester modified polydimethylsiloxane containing an acryl group, polyether-polyester-modified polydimethylsiloxane containing a hydroxyl group, polyether ester modified polydimethylsiloxane containing an acryl group, polyether modified polysiloxane copolymer, a silicone-based surface control agent such as silicone modified acrylate, or a fluorinated surface control agent such as fluorinated polyoxyethylene ether and fluorine modified acrylic polymer.

Specific examples of the surface control agents include, but are not limited to, "BYK-350, 352, 354, 355, 358N, 361N, 381N, 381, and 392" manufactured by BYK-Chemie for acryl-based surface control agents; "BYK-300, 302, 306, 307, 310, 315, 320, 322, 323, 325, 330, 331, 333, 337, 340, 344, 370, 375, 377, 355, 356, 357, 390, UV3500, UV3510, and UV3570" manufactured by BYK-Chemie and "Tego-rad-2100, 2200, 2250, 2500, and 2700, TegoGlide-410, 432, and 450" manufactured by Evonik Degussa for silicone-based surface control agents; and "Ftergent 222F and Ftergent 215M" manufactured by NEOS for fluorine-based surface control agents. One type of surface control agent, or two or more types of surface control agents as needed, may be used.

By including a surface control agent in the maintenance liquid, good cleaning and preserving abilities may be exhibited. Although the underlying mechanism is not clear, when the ink is diluted by a maintenance liquid, the dispersing agents which were previously adsorbed to the pigments are dissociated, leaving aggregates of the pigments and excess dispersant resins not adsorbed to the pigments. These pigment aggregates and excess pigment dispersant resins may cause clogging of the nozzle and the ink passages. When the surface control agent is included in the maintenance liquid, the surface control agent will align on the nozzle plate and on the ink passage wall surface, preventing the aggregated pigments (caused by disturbance of the dispersion) and the excess dispersant resins not adsorbed to the pigments from adhering to the nozzle plate surface and the ink passage wall surface, and preventing clogging of the ink passage etc. from occurring. This is believed to result in the improvement in the cleaning ability and the storage stability.

The silicone-based and fluorine-based surface control agents, in particular, show a good anti-adhesion property.

Among them, polyether modified dimethylsiloxane, a silicone-based surface control agent, is preferable due to its surface tension-reducing ability, compatibility with the curable compounds, and compatibility with the inkjet ink compositions.

The amount of the surface control agent in the maintenance liquid in the present invention is preferably 0.01 to 10% by weight, more preferably 0.2 to 10% by weight, and even more preferably 1 to 10% by weight.

By including 0.01% by weight or more of the surface control agent in the maintenance liquid, good cleaning ability can be exhibited, and when the amount is even larger, for example at 0.05% by weight or more, adhesion of the pigments and excess dispersant resins to the nozzle and ink passages can be suppressed to provide excellent continuous jettability after the cleaning as well as excellent storage stability. If the maintenance liquid contains more than 10% by weight of a surface control agent, its viscosity becomes high, and it may no longer be suitable as a maintenance liquid.

The maintenance liquid in the present invention may comprise a polymerization inhibitor. When an active energy ray-curable compound is used as the main liquid component of the maintenance liquid, the inclusion of the polymerization inhibitor could prevent an increase of the viscosity of the maintenance liquid, to provide good storage stability.

One type or two or more types of polymerization inhibitors such as phenothiazine, hydroquinone, p-methoxyphenol, t-butylcatechol, pyrogallol, butylhydroxytoluene, and 2,6-di-tert-butyl-4-methylphenol may be used, as needed. Specifically, BHT SWANOX (manufactured by Seiko Chemical, 2,6-di-tert-butyl-4-methylphenol), phenothiazine (manufactured by Seiko Chemical) or the like may be used.

The cleaning liquid of the present invention preferably comprises 0.01 to 5% by weight of a polymerization inhibitor.

The active energy ray-curable inkjet ink in the present invention comprises at least a coloring agent, a polymerizable monomer, and a photopolymerization initiator, and may further comprise a pigment dispersant resin, a surface control agent, a polymerization inhibitor and/or a solvent as needed.

As the polymerizable monomer used in the active energy ray-curable inkjet ink in the present invention, the monofunctional and bifunctional active energy ray-curable compounds mentioned above may be used. Furthermore, a polyfunctional monomer may also be used as needed.

Specific examples of the polyfunctional monomer include, but are not limited to, trimethylol propane triacrylate, hydroxypyvalic acid trimethylol propane triacrylate, ethoxylated phosphoric acid triacrylate, pentaerythritol triacrylate, tetramethylol propane triacrylate, tetramethylol methane triacrylate, caprolactone modified trimethylol propane triacrylate, propoxylate glyceryl triacrylate, trimethylol propane oligoacrylate, ethoxylated trimethylol propane triacrylate, propoxylated trimethylol propane triacrylate, ethoxylated isocyanuric acid triacrylate, tri(2-hydroxyethyl isocyanurate)triacrylate, tri(meth)allyl isocyanurate trimethylol propane triacrylate, hydroxypyvalic acid trimethylol propane triacrylate, ethoxylated phosphoric acid triacrylate, neopentyl glycol modified trimethylol propane diacrylate, pentaerythritol triacrylate, tetramethylol propane triacrylate, tetramethylol methane triacrylate, pentaerythritol tetraacrylate, caprolactone modified trimethylol propane triacrylate, propoxylate glyceryl triacrylate, tetramethylol methane tetraacrylate, pentaerythritol tetraacrylate, ditrimethylol propane tetraacrylate, ethoxylated pentaerythritol tetraacrylate, dipentaerythritol hexaacrylate, caprolactone modified dipentaerythritol hexaacrylate, dipentaerythritol hydroxyl pentaacrylate, and the likes. One type, or two or more types as needed, of bifunctional and polyfunctional monomers may be used.

It is preferable to use any of 2-phenoxyethyl acrylate, dipropylene glycol diacrylate, or 2-(2-vinyloxyethoxy)ethyl acrylate as the polymerizable monomer in the active energy ray-curable inkjet ink.

Besides the above-mentioned monomers, those called oligomers or prepolymers may also be used in the active energy ray-curable inkjet ink in the present invention.

Moreover, in order to reduce the viscosity of the ink and to improve its wet-spreadability on a substrate, the organic solvent mentioned above may be included in the active energy ray-curable inkjet ink in the present invention.

The active energy ray described here refers to energy rays which can influence the electron orbitals of the irradiated objects to trigger polymerization reactions of radicals, cations, anions or the likes, such as electron beam, ultraviolet ray, and infrared ray, but any energy rays that can induce polymerization reactions are encompassed therein without limitation.

For the coloring agents, conventionally, dyes and pigments have been widely used, but use of pigments is more prevalent especially due to their weather resistance. As a pigment component, achromatic pigments such as carbon black, titanium oxide and calcium carbonate or chromatic organic pigments may be used. Examples of the organic pigments include: insoluble azo pigments such as toluidine red, toluidine maroon, Hansa yellow, benzidine yellow, and pyrazolone red; soluble azo pigments such as lithol red, Helio Bordeaux, pigment scarlet, and permanent red 2B; derivatives of vat dyes such as alizarin, indanthrone, and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments; condensed azo-based organic pigments; benzimidazolone-based organic pigments; quinophthalone-based organic pigments such as quinophthalone yellow; and isoindoline-based organic pigments such as isoindoline yellow; and other pigments such as flavanthrone yellow, acylamide yellow, nickel azo yellow, copper azomethine yellow, perinone orange, anthrone orange, dianthraquinonyl red, and dioxazine violet.

Examples of the organic pigments as expressed by color index (C.I.) numbers include: C. I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, and 185; C. I. Pigment Orange 16, 36, 43, 51, 55, 59, and 61; C. I. Pigment Red 9, 48, 49, 52, 53, 57, 97, 122, 123, 149, 168, 177, 180, 192, 202, 206, 215, 216, 217, 220, 223, 224, 226, 227, 228, 238, and 240; C. I. Pigment Violet 19, 23, 29, 30, 37, 40, and 50; C. I. Pigment Blue 15, 15:1, 15:3, 15:4, 15:6, 22, 60, and 64; C. I. Pigment Green 7 and 36; and C. I. Pigment Brown 23, 25, and 26.

Specific examples of carbon black include: "Special Black 350, 250, 100, 550, 5, 4, 4A, and 6," and "Printex U, V, 140U, 140V, 95, 90, 85, 80, 75, 55, 45, 40, P, 60, L6, L, 300, 30, 3, 35, 25, A and G" manufactured by Degussa; "REGAL 400R, 660R, 330R, and 250R" and "MOGUL E and L" manufactured by Cabot; and "MA7, 8, 11, 77, 100, 100R, 1005, 220, and 230", "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95, and #260" manufactured by Mitsubishi Chemical.

Specific examples of titanium oxide include: "TIPAQUE CR-50, 50-2, 57, 80, 90, 93, 95, 953, 97, 60, 60-2, 63, 67, 58, 58-2, and 85", "TIPAQUE R-820, 830, 930, 550, 630, 680, 670, 580, 780, 780-2, 850, and 855", "TIPAQUE A-100 and 220", "TIPAQUE W-10", "TIPAQUE PF-740 and 744", "TTO-55(A), 55(3), 55(C), 55(D), 55(S), 55(N), 51(A), and 51(C)", "TTO-S-1 and 2", and "TTO-M-1 and 2" manufactured by Ishihara Sangyo Kaisha; "Titanix JR-301, 403, 405, 600A, 605, 600E, 603, 805, 806, 701, 800, and 808", and "Titanix JA-1, C, 3, 4, and 5" manufactured by Tayca; and "Ti-Pure R-900, 902, 960, 706, and 931" manufactured by du Pont.

The pigment used in the active energy ray-curable inkjet ink in the present invention is included in the ink preferably at 0.1 to 30% by weight in order to achieve a sufficient concentration and sufficient light resistance.

It is preferable to add the pigment dispersant resin mentioned above to the active energy ray-curable inkjet ink in the present invention, in order to improve the dispersion of the pigment and storage stability of the ink. The pigment dispersant resin is preferably included in the ink at 0.01 to 20% by weight.

It is preferable to add an acidic derivative an organic pigment to the active energy ray-curable inkjet ink in the present invention when the pigment is being dispersed, in order to further improve the dispersion of the pigment and the storage stability of the ink.

Examples of the photopolymerization initiator in the active energy ray-curable inkjet ink in the present invention include: 4-(methylphenylthio)phenyl]phenyl methanone, benzoin isobutyl ether, 2,4-diethylthioxanthone, 2-isopropylthioxanthone, benzyl, 2,4,6-trimethylbenzoyl diphenylphosphine oxide, 2-benzyl-2-dimethylamino-1-(4-morpholinophenyl)-butan-1-one, bis(2,4,6-dimethoxybenzoyl)-(2,4,4-trimethylpentyl)phosphine oxide, 1,2-octanedione, 1-(4-(phenylthio)-2,2-(O-benzoyloxime)), oligo(2-hydroxy-2-methyl-1-(4-(1-methylvinyl)phenyl)propanone), 1-hydroxycyclohexyl phenyl ketone, benzoin ethyl ether, benzyl dimethyl ketal, 2-hydroxy-2-methyl-1-phenyl propane-1-one, 1-(4-isopropylphenyl)-2-hydroxy-2-methylpropane-1-one and 2-methyl-1-(4-methylthiophenyl)-2-morpholino-propan-1-one, benzophenone, 4-phenylbenzophenone, isophthalphenone, and 4-benzoyl-4'-methyl-diphenyl sulfide. Two or more photopolymerization initiators can be used in combination as needed. These photopolymerization initiators are only non-limiting examples.

The active energy ray-curable inkjet ink in the present invention preferably comprises a sensitizing agent, as needed. As a specific example, the amines that do not undergo addition reactions with the above-mentioned polymerizable components, such as ethyl-4-dimethylaminobenzoate, trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone, may be used together. Needless to say, it is preferable to select photoradical polymerization initiators and sensitizing agents that show good solubility in the ultraviolet ray-curable compound and that do not inhibit the ultraviolet ray transmittance. The above-mentioned sensitizing agents are non-limiting examples.

The photopolymerization initiator agent and the sensitizing agent are included preferably at 2 to 25% by weight relative to the polymerizable monomer. If this amount is less than 2% by weight, the cure rate will become significantly poor. The amount in excess of 25% by weight does not change the cure rate compared to when the agents are at 10% by weight, and moreover, such excess amounts of the agents could result in insufficient dissolution, and could cause the problem of increased ink viscosity and poor inkjet jettability even if the residual agents are dissolved by heating.

The above-mentioned surface control agent is preferably included in the active energy ray-curable inkjet ink in the present invention if needed.

The surface control agent is included preferably at 0.001 to 5% by weight in the active energy ray-curable inkjet ink. If this amount is less than 0.001% by weight, the wet-spreadability could become poor. If this amount exceeds 5% by weight, then it would not be possible for all of the surface control agent to be aligned in the ink interface, and therefore no further effects will be exhibited above a certain level.

In the present invention, one type or two or more types of polymerization inhibitors may be used as needed, such as phenothiazine, hydroquinone, p-methoxyphenol, t-butylcatechol, pyrogallol and butylhydroxytoluene, to enhance the viscosity stability of the ink over time, the jettability after an extended period of time, and the in-machine viscosity stability in the recording apparatus. For the inkjet ink of the present invention, it is preferable to add the polymerization inhibitor at 0.01 to 5% by weight in the ink, more preferably at 0.05 to 5% by weight, and even more preferably at 0.05 to 1% by weight.

The cleaning liquid and the active energy ray-curable inkjet ink composition in the present invention are preferably filtered, after the dissolution of the photopolymerization initiator, through a filter having a pore size of 3 μm or less, preferably a pore size of 1 μm or less, in order to prevent clogging in the head.

The active energy ray-curable inkjet ink of the present invention should have an electrical conductivity of 10 μS/cm or lower in the case of a piezo head, and show no electrical corrosion inside the head. In the case of a continuous type, adjustment of the electrical conductivity by electrolytes will be necessary. In this case, it will be necessary to adjust the electrical conductivity to 0.5 mS/cm or higher.

EXAMPLES

The present invention will be described more specifically by the following Examples and Comparative Examples, but the embodiments of the present invention are not limited to these Examples. Hereinafter, the parts represent parts by weight in all instances.

(Production of Ink M1)

| | |
|---|---|
| Pigment: quinacridone pigment, C.I. Pigment Violet 19 (manufactured by Clariant) "INK Jet Magenta E5B02" | 30.0 parts |
| Pigment dispersant resin: Solsperse 32000 (manufactured by Lubrizol, polyethyleneimine-based basic dispersant resin) | 15.0 parts |
| Monomer: dipropylene glycol diacrylate (manufactured by BASF) | 55.0 parts |

The above materials were stirred to homogeneity in a high-speed mixer or the like, and the mill base thus obtained was dispersed for about one hour in a horizontal sand mill to produce pigment dispersion.

Ten (10.0) parts of the produced pigment dispersion and the materials shown below were combined, stirred for 3 hours using a rotary disper with heating to 45° C., and filtered with a 1 μm membrane filter to produce Ink M1.

| | |
|---|---|
| Monomer: dipropylene glycol diacrylate (manufactured by BASF) | 17.0 parts |
| 2-(2-vinyloxyethoxy)ethyl acrylate (manufactured by Nippon Shokubai) | 40.0 parts |
| N-vinylcaprolactam (manufactured by BASF) | 20.0 parts |
| Initiator: IRGACURE 819 (manufactured by BASF) | 2.5 parts |
| Lucirin TPO (manufactured by BASF) | 2.5 parts |
| IRGACURE 369 (manufactured by BASF) | 2.5 parts |
| KAYACURE BMS (manufactured by Nippon Kayaku) | 2.5 parts |
| Inhibitor: BHT SWANOX (manufactured by Seiko Chemical) | 1.0 part |
| Phenothiazine (manufactured by Seiko Chemical) | 1.0 part |
| Surface control agent: BYK UV3510 (manufactured by BYK Chemie, polyether-modified polydimethylsiloxane) | 1.0 part |

(Production of Ink K1)

Ink K1 was produced by a process similar to the one used for the production of Ink M1, except that the above-mentioned pigment used for Ink M1 was replaced with a carbon black pigment ("Special Black 350" manufactured by Degussa).

(Production of Ink W1)

Pigment dispersion was produced by a similar process except that the above-mentioned pigment used for Ink M1 was replaced with a titanium oxide pigment ("PF-740" manufactured by Ishihara Sangyo Kaisha). Ink W1 was produced by a process similar to the one used for the production of M1, except that 30.0 parts of the pigment dispersion was added and N-vinylcaprolactam was not added.

(Production of Ink M2)

Ink M2 was produced by a process similar to the one used for the production of Ink M1, except that the above-mentioned pigment dispersant resin used for Ink M1 was replaced with Solsperse J-100 (manufactured by Lubrizol, polyethyleneimine-based basic dispersant resin).

Examples 1 to 10

Next, according to the formula shown in Table 1, the components shown, one by one from the top of the Table, were added under stirring, and stirred for 30 minutes using a rotary disper with heating to 45° C., and filtered with a 1 µm membrane filter to obtain maintenance liquids. The evaluations of the cleaning ability and the preserving ability were conducted using these maintenance liquids and the above-mentioned ink compositions.

The values shown in Tables 1 to 3 represent the proportions (% by weight) of the components.

Examples 11 to 22

In a similar fashion to Examples 1 to 10, maintenance liquids were produced according to the formula shown in Table 2, and the evaluations of the cleaning ability and the preserving ability were conducted.

Comparative Examples 1 to 4

In a similar fashion to Examples 1 to 10, maintenance liquids were produced according to the formula shown in Table 3, and the evaluations of the cleaning ability and the preserving ability were conducted.

The ingredients in the maintenance liquids in Tables 1 to 3 are as follows.

Organic Solvents
BuCBAc: diethylene glycol monobutyl ether acetate (manufactured by Daicel Chemical)
DEDG: diethyl diglycol (manufactured by Nippon Nyukazai) Active energy ray-curable compounds
DPGDA: dipropylene glycol diacrylate (manufactured by BASF)
VEEA: 2-(2-vinyloxyethoxy) ethyl acrylate (manufactured by Nippon Shokubai)
PEA: phenoxyethyl acrylate (manufactured by Sartomer)
Pigment dispersant resins
SP32000: Solsperse 32000 (manufactured by Lubrizol, polyethyleneimine-based basic dispersant resin)
EFKA7701: EFKA7701 (manufactured by Efka Chemicals)
SP J-100: Solsperse J-100 (manufactured by Lubrizol, polyethyleneimine-based basic dispersant resin)
SP J-180: Solsperse J-180 (manufactured by Lubrizol, polyethyleneimine-based basic dispersant resin)
LPN22252: LPN22252 (manufactured by BYK Chemie, urethane skeleton basic dispersant resin)
Surface Control Agents
BYK UV3510: BYK-UV3510 (manufactured by BYK Chemie, polyether-modified polydimethylsiloxane)
BYK 333: BYK-333 (manufactured by BYK Chemie, polyether-modified polydimethylsiloxane)
FT222F: Ftergent 222F (manufactured by NEOS, non-ionic fluorine-based surfactant)
BYK 361N: BYK 361N (manufactured by BYK Chemie, acryl-based surface control agent
Polymerization Inhibitor
BHT: BHT SWANOX (manufactured by Seiko Chemical)

<Evaluation of Cleaning Ability>
(Cleaning Ability Test)

Five grams of the ink was placed in a 30 ml glass petri dish, spread uniformly inside the petri dish, and then discarded. Five grams of the maintenance liquid was placed in the petri dish which had been stained with the ink, and the maintenance liquid was spread uniformly inside the petri dish to clean the petri dish. The cleaning followed by disposal of the maintenance liquid was repeated three times and then the remaining color was examined.

The evaluation scales were as follows, and single circle (◯) or better was considered "good".

⊚: Almost no ink color is remaining.
◯: Ink color is remaining a little.
x: Ink color is remaining.

(Continuous Jetting Test)

The printer head (KJ-4A manufactured by Kyocera) was filled with the ink. After ten thousand bursts of jetting, the nozzle was wiped 100 times with cloth dampened with the maintenance liquid, and then tested for any missed nozzles. Missed nozzle refers to a circumstance where the ink fails to be jetted from the nozzle due to clogging etc. of the nozzle or ink passages by foreign matters such as ink aggregates.

The evaluation scales were as follows, and single circle (◯) or better was considered "good".

⊚: No missed nozzle
◯: 1 or 2 missed nozzles
Δ: 3 to 10 missed nozzles
x: 11 or more missed nozzles <Evaluation of Preserving Ability>
(Dispersion Stability Test)

A diluted ink solution, obtained by diluting the ink to 0.1% by weight with the maintenance liquid, was placed in a glass bottle and left for 1 month at 45° C., and the extent of ink precipitation after this time period was examined.

The evaluation scales were as follows, and single circle (◯) or better was considered "good".

⊚: Almost no pigment has been precipitated.
◯: Pigment has been precipitated a little.
x: Most pigment has been precipitated.

(Nozzle Plate Water Repellency Test)

The nozzle plate part of the head (KJ-4A manufactured by Kyocera) was submerged in a diluted ink solution (obtained by diluting the ink to 0.1% by weight with the maintenance liquid) and left for 1 month at 45° C. After removing the cleaning liquid by dry cloth, water repellency of the nozzle plate was assessed by measuring the contact angle of 1 µl water against the nozzle plate surface.

The evaluation scales were as follows, and triangle (Δ) or better was considered "good".

⊚: Contact angle of the water is 90° or higher.
◯: Contact angle of the water is 80° or higher, but lower than 90°.
Δ: Contact angle of the water is 70° or higher, but lower than 80°.
x: Contact angle of the water is lower than 70°.

(Storage Stability Test)

The ink was rinsed out by filling the head with the maintenance liquid until the ink concentration within the head became 0.1% by weight. The head was then removed and left for 1 month at 45° C. The head was refilled with the ink and the printing test was conducted.

⊚: No missed nozzle
◯: 1 or 2 missed nozzles
Δ: 3 to 10 missed nozzles
x: 11 or more missed nozzles

TABLE 1

| | | | Example 1 | Example 2 | Example 3 | Example 4 | Example 5 |
|---|---|---|---|---|---|---|---|
| Maintenance Liquid Composition | Organic Solvent Curable Compound | BuCBAc | 99.865% | | 45.850% | 33.830% | 96.850% |
| | | DEDG | | 99.780% | | 40% | |
| | | DPGDA | | | | 20% | |
| | | VEEA | | | | | |
| | | PEA | | | 50% | | |
| | Pigment Dispersant Resin | SP32000 | 0.015% | 0.030% | 4% | 6% | |
| | | EFKA7701 | | | | | 3% |
| | | SP J-100 | | | | | |
| | | SP J-180 | | | | | |
| | | LPN22252 | | | | | |
| | Surface Control Agent | BYK UV3510 | 0.020% | 0.09% | | | |
| | | BYK 333 | | | 0.05% | | 0.05% |
| | | FT222F | | | | 0.07% | |
| | | BYK 361N | | | | | |
| | Polymerization Inhibitor | BHT | 0.100% | 0.100% | 0.100% | 0.100% | 0.100% |
| | | Total | 100.000% | 100.000% | 100.000% | 100.000% | 100.000% |
| Ink Used | | | M1 | K1 | M1 | M1 | M1 |
| Evaluation of cleaning ability | | Cleaning Ability Test | ○ | ○ | ○ | ○ | ○ |
| | | Continuous Jetting Test | ○ | ○ | ○ | ○ | ○ |
| Evaluation of preserving ability | | Dispersion Stability Test | ○ | ◎ | ◎ | ◎ | ○ |
| | | Nozzle Plate Water Repellency Test | ○ | ○ | ○ | Δ | ○ |
| | | Storage Stability Test | ○ | ○ | ○ | ○ | ○ |

| | | | Example 6 | Example 7 | Example 8 | Example 9 | Example 10 |
|---|---|---|---|---|---|---|---|
| Maintenance Liquid Composition | Organic Solvent Curable Compound | BuCBAc | 96.340% | 59.800% | | | 17.850% |
| | | DEDG | | | | | |
| | | DPGDA | | 40% | 97.330% | | 80% |
| | | VEEA | | | | 48.850% | |
| | | PEA | | | | 50% | |
| | Pigment Dispersant Resin | SP32000 | 3.50% | 0.05% | 2.50% | 1.00% | |
| | | EFKA7701 | | | | | 2% |
| | | SP J-100 | | | | | |
| | | SP J-180 | | | | | |
| | | LPN22252 | | | | | |
| | Surface Control Agent | BYK UV3510 | 0.06% | | | 0.05% | 0.05% |
| | | BYK 333 | | | 0.07% | | |
| | | FT222F | | 0.05% | | | |
| | | BYK 361N | | | | | |
| | Polymerization Inhibitor | BHT | 0.100% | 0.100% | 0.100% | 0.100% | 0.100% |
| | | Total | 100.000% | 100.000% | 100.000% | 100.000% | 100.000% |
| Ink Used | | | M2 | M1 | K1 | W1 | M1 |
| Evaluation of cleaning ability | | Cleaning Ability Test | ○ | ○ | ○ | ○ | ○ |
| | | Continuous Jetting Test | ○ | ◎ | ◎ | ◎ | ○ |
| Evaluation of preserving ability | | Dispersion Stability Test | ○ | ◎ | ◎ | ◎ | ○ |
| | | Nozzle Plate Water Repellency Test | ○ | ○ | ○ | ○ | ○ |
| | | Storage Stability Test | ○ | ○ | ○ | ○ | ○ |

TABLE 2

|  |  |  | Example 11 | Example 12 | Example 13 | Example 14 | Example 15 | Example 16 |
|---|---|---|---|---|---|---|---|---|
| Maintenance Liquid Composition | Organic Solvent | BuCBAc | 99.350% | 90.850% |  |  | 90.850% |  |
|  |  | DEDG |  |  |  |  |  |  |
|  | Curable Compound | DPGDA |  |  |  |  | 97.850% |  | 97.850% |
|  |  | VEEA |  |  | 99.350% |  |  |  |
|  |  | PEA |  |  |  |  |  |  |
|  | Pigment Dispersant | SP32000 |  |  |  |  |  |  |
|  |  | EFKA7701 |  |  |  |  |  |  |
|  | Resin | SP J-100 |  |  |  |  |  |  |
|  |  | SP J-180 |  |  |  |  |  |  |
|  |  | LPN22252 |  |  |  |  |  |  |
|  | Surface Control Agent | BYK UV3510 | 0.500% | 9.00% | 0.500% | 2.00% |  |  |
|  |  | BYK 333 |  |  |  |  |  |  |
|  |  | FT222F |  |  |  |  |  |  |
|  |  | BYK 361N |  |  |  |  | 9.00% | 2.00% |
|  | Polymerization Inhibitor | BHT | 0.100% | 0.100% | 0.100% | 0.100% | 0.100% | 0.100% |
|  |  | Total | 100.000% | 100.000% | 100.000% | 100.000% | 100.000% | 100.000% |
|  | Ink used |  | M1 | M1 | M1 | M1 | M1 | M1 |
| Evaluation of cleaning ability | Cleaning Ability Test |  | ○ | ○ | ○ | ◎ | ○ | ○ |
|  | Continuous Jetting Test |  | ○ | ○ | ◎ | ◎ | ○ | ◎ |
| Evaluation of preserving ability | Dispersion Stability Test |  | ◎ | ◎ | ◎ | ◎ | ◎ | ◎ |
|  | Nozzle Plate Water Repellency Test |  | ◎ | ◎ | ◎ | ◎ | ○ | ○ |
|  | Storage Stability Test |  | ○ | ◎ | ◎ | ◎ | ○ | ○ |

|  |  |  | Example 17 | Example 18 | Example 19 | Example 20 | Example 21 | Example 22 |
|---|---|---|---|---|---|---|---|---|
| Maintenance Liquid Composition | Organic Solvent | BuCBAc | 96.850% | 96.850% | 96.850% |  |  |  |
|  |  | DEDG |  |  |  |  |  |  |
|  | Curable Compound | DPGDA |  |  |  | 97.350% | 97.350% | 97.350% |
|  |  | VEEA |  |  |  |  |  |  |
|  |  | PEA |  |  |  |  |  |  |
|  | Pigment Dispersant | SP32000 |  |  |  |  |  |  |
|  |  | EFKA7701 |  |  |  |  |  |  |
|  | Resin | SP J-100 | 3% |  |  | 2.50% |  |  |
|  |  | SP J-180 |  | 3% |  |  | 2.50% |  |
|  |  | LPN22252 |  |  | 3% |  |  | 2.50% |
|  | Surface Control Agent | BYK UV3510 | 0.05% | 0.05% | 0.05% | 0.05% | 0.05% | 0.05% |
|  |  | BYK 333 |  |  |  |  |  |  |
|  |  | FT222F |  |  |  |  |  |  |
|  |  | BYK 361N |  |  |  |  |  |  |
|  | Polymerization Inhibitor | BHT | 0.100% | 0.100% | 0.100% | 0.100% | 0.100% | 0.100% |
|  |  | Total | 100.000% | 100.000% | 100.000% | 100.000% | 100.000% | 100.000% |
|  | Ink used |  | M1 | M1 | M1 | M1 | M1 | M1 |
| Evaluation of cleaning ability | Cleaning Ability Test |  | ○ | ○ | ○ | ○ | ○ | ○ |
|  | Continuous Jetting Test |  | ○ | ○ | ○ | ◎ | ◎ | ◎ |
| Evaluation of preserving ability | Dispersion Stability Test |  | ◎ | ◎ | ◎ | ◎ | ◎ | ◎ |
|  | Nozzle Plate Water Repellency Test |  | ○ | ○ | ○ | ○ | ○ | ○ |
|  | Storage Stability Test |  | ○ | ○ | ○ | ○ | ○ | ○ |

TABLE 3

|  |  |  | Comparative Example 1 | Comparative Example 2 | Comparative Example 3 | Comparative Example 4 |
|---|---|---|---|---|---|---|
| Maintenance Liquid Composition | Organic Solvent | BuCBAc | 99.900% | 92.900% |  |  |
|  |  | DEDG |  |  |  |  |
|  | Curable Compound | DPGDA |  |  | 99.850% | 91.900% |
|  |  | VEEA |  |  |  |  |
|  |  | PEA |  |  |  |  |
|  | Pigment Dispersant Resin | SP32000 |  | 7.000% | 0.050% |  |
|  |  | EFKA7701 |  |  |  |  |
|  |  | SP J-100 |  |  |  |  |
|  |  | SP J-180 |  |  |  |  |
|  |  | LPN22252 |  |  |  |  |
|  | Surface Control Agent | BYK UV3510 |  |  |  | 8.00% |
|  |  | BYK 333 |  |  |  |  |
|  |  | FT222F |  |  |  |  |
|  |  | BYK 361N |  |  |  |  |
|  | Polymerization Inhibitor | BHT | 0.100% | 0.100% | 0.100% | 0.100% |
|  |  | Total | 100.000% | 100.000% | 100.000% | 100.000% |
| Ink used |  |  | M1 | M1 | M1 | M1 |
| Evaluation of cleaning ability | Cleaning Ability Test |  | X | X | X | ○ |
|  | Continuous Jetting Test |  | X | Δ | Δ | ○ |
| Evaluation of preserving ability | Dispersion Stability Test |  | X | ◎ | ◎ | X |
|  | Nozzle Plate Water Repellency Test |  | X | X | Δ | X |
|  | Storage Stability Test |  | X | X | Δ | X |

Examples 1 to 22 are examples containing a main liquid component, a pigment dispersant resin and a surface control agent, and they produced good results in each of cleaning ability, continuous jettability, dispersion stability, water repellency on the nozzle plate, and storage stability.

Examples 2 to 4, 7 to 9, and 11 to 16 comprise the same pigment dispersant resin as in the ink, and moreover, the amounts of the pigment dispersant resin in these Examples are 0.02% by weight or more, and therefore adsorption of the pigment dispersant resin to the pigment is facilitated, exhibiting superior dispersion stability. Moreover, Examples 2, 3, 7 to 9, and 11 to 16 comprise no more than 5% by weight of the pigment dispersant resin, and therefore the amount of excess pigment dispersant resin not adsorbing to the pigment is small, preserving the good water repellency on the nozzle plate.

Examples 7 to 10, 13, 14, 16, and 20 to 22 comprise 30% by weight or more of the same active energy ray-curable compound that is used in the ink, and therefore allow the pigment dispersant resin and the surface control agent to have good compatibility with the ink and to work effectively, exhibiting even superior continuous jettability.

Examples 11 to 14 use 0.2 to 10% by weight of the surface control agent, to provide superior water repellency on the nozzle plate. Further, Example 14 comprises 1 to 10% by weight of the surface control agent, and uses the active energy ray-curable compound, to provide even superior cleaning ability, continuous jettability, and storage stability.

Examples 17 to 22 use basic dispersant resins Solsperse J-100, Solsperse J-180 and LPN22252 as the pigment dispersant resin in the cleaning liquid, and exhibit superior dispersion stability even if these pigment dispersant resins are of different types from the one used in the ink. Further, Examples 20 to 22 use these resins in combination with the active energy ray-curable compound to provide superior continuous jettability.

Comparative Example 1 shows a significantly poorer result in each of these tests because it does not comprise a pigment dispersant resin or a surface control agent.

Comparative Examples 2 and 3 comprise the pigment dispersant resin but no surface control agent, and show poor cleaning ability. Moreover, they failed to prevent adsorption of the pigment and the excess pigment dispersant resin to the nozzle plate, causing poor storage stability.

Comparative Example 4 does not comprise a pigment dispersant resin, and therefore, while showing good short-term performance as a cleaning liquid with respect to cleaning ability and continuous jettability, their performance as a preserving liquid in an extended period of time is significantly poor, such as with respect to dispersion stability, nozzle plate water repellency, and storage stability.

From the above results, it was confirmed that inclusion of a main liquid component, a pigment dispersant resin, and a surface control agent is essential for obtaining a maintenance liquid having excellent cleaning ability and preserving ability.

INDUSTRIAL APPLICABILITY

The present invention is a cleaning liquid for removing an ink used in active energy ray-curable inkjet printing as well as a preserving liquid to fill the head when the printer machine is not in operation, and exhibits excellent cleaning ability and preserving ability. Thus, the present invention can be used for a maintenance liquid for inkjet printing of manufacturing or industrial purposes, for example.

The invention claimed is:

1. A maintenance liquid comprising
an active energy ray-curable compound in an amount of 70% by weight or more in 100% by weight of the maintenance liquid, wherein the active energy ray-curable compound is dipropylene glycol diacrylate,
a poly ether modified dimethylsiloxane silicone-based surface control agent in an amount of 0.2 to 10% by weight in 100% by weight of the maintenance liquid, and
a polyethyleneimine-based pigment dispersant resin in an amount of 0.02 to 5% by weight in 100% by weight of the maintenance liquid, and
wherein said maintenance liquid does not comprise a photopolymerization initiator, a coloring agent, a dye, or a pigment.

2. The maintenance liquid according to claim 1, wherein the amount of the surface control agent is 1 to 10% by weight in 100% by weight of the maintenance liquid.

3. The maintenance liquid according to claim 1, wherein the amount of the polyethyleneimine-based pigment dispersant resin is 0.05 to 3% by weight in 100% by weight of the maintenance liquid.

4. The maintenance liquid according to claim 1, further comprising 0.05 to 5% by weight of a polymerization inhibitor in 100% by weight of the maintenance liquid.

5. The maintenance liquid according to claim 1, wherein the maintenance liquid consists of the active energy ray-curable compound, the pigment dispersant resin, the surface control agent, and optionally a polymerization inhibitor.

6. A maintenance liquid comprising:
an active energy ray-curable compound in an amount of 70% by weight or more in 100% by weight of the maintenance liquid, wherein the active energy ray-curable compound is dipropylene glycol diacrylate,
a polyether modified dimethylsiloxane silicone-based surface control agent in an amount of 0.2 to 10% by weight in 100% by weight of the maintenance liquid, and
a pigment dispersant resin
selected from the group consisting of a basic dispersant resin having a basic functional group, a basic dispersant resin having a urethane skeleton, and a polyalkyleneimine-based pigment dispersant resin in an amount of 0.02 to 5% by weight in 100% by weight of the maintenance liquid, and
wherein said maintenance liquid does not comprise a photopolymerization initiator.

7. A method for removing inkjet ink from a surface comprising;
contacting the surface with an active energy ray-curable inkjet ink, the active energy ray-curable inkjet ink comprising: (a) a polymerizable monomer; (b) a photopolymerization initiator; (c) a coloring agent, a dye, or a pigment; and (d) a pigment dispersant resin;
and then
contacting the surface with the maintenance liquid according to claim 6 to dilute the active energy ray-curable inkjet ink,
wherein the pigment dispersant resin comprised in the maintenance liquid and the pigment dispersant resin comprised in the inkjet ink are identical compounds.

8. The method of claim 7, wherein the surface is an inkjet head, ink passage, or nozzle.

9. The method of claim 7, wherein the active energy ray-curable compound comprised in the maintenance liquid and the polymerizable monomer comprised in the inkjet ink are identical compounds.

10. The method of claim 7, wherein the pigment dispersant resin comprised in the maintenance liquid and in the inkjet ink is a polyethyleneimine-based pigment dispersant resin.

11. The method of claim 7, wherein the active energy ray-curable inkjet ink comprises dipropylene glycol diacrylate and 2-(2-vinyloxyethoxy)ethyl acrylate.

12. The method of claim 11, wherein the active energy ray-curable inkjet ink comprises at least 62.5% by combined weight of dipropylene glycol diacrylate and 2-(2-vinyloxyethoxy)ethyl acrylate in 100% by weight of the active energy ray-curable inkjet ink.

13. A method for cleaning, maintaining, or preserving an inkjet printer comprising contacting a component of said printer, which contacts an active energy ray-curable inkjet ink comprising: (a) a polymerizable monomer; (b) a photopolymerization initiator; and (c) a coloring agent, a dye, or a pigment, and (d) a pigment dispersant resin, with the maintenance liquid according to claim 6 to dilute the active energy ray-curable inkjet ink,
wherein the pigment dispersant resin comprised in the maintenance liquid and the pigment dispersant resin comprised in the inkjet ink are identical compounds.

14. The method of claim 13, wherein the active energy ray-curable compound comprised in the maintenance liquid and the polymerizable monomer comprised in the inkjet ink are identical compounds.

15. The method of claim 13, wherein the pigment dispersant resin comprised in the maintenance liquid and in the inkjet ink is a polyethyleneimine-based pigment dispersant resin.

16. The method of claim 13, wherein the active energy ray-curable inkjet ink comprises dipropylene glycol diacrylate and 2-(2-vinyloxyethoxy)ethyl acrylate.

17. The method of claim 16, wherein the active energy ray-curable inkjet ink comprises at least 62.5% by combined weight of dipropylene glycol diacrylate and 2-(2-vinyloxyethoxy)ethyl acrylate in 100% by weight of the active energy ray-curable inkjet ink.

* * * * *